United States Patent

[11] 3,565,271

[72] Inventor Wesley A. Deck
 30 N. Columbine Ave., Lombard, Ill. 60148
[21] Appl. No. 873,941
[22] Filed Nov. 4, 1969
[45] Patented Feb. 23, 1971

[54] STRUCTURE FOR INVERTING A BOAT FOR LOADING ON AN AUTOMOBILE
 5 Claims, 14 Drawing Figs.
[52] U.S. Cl. .................................................. 214/450; 214/1
[51] Int. Cl. .................................................. B60r 9/00
[50] Field of Search .......................................... 214/450

[56] References Cited
UNITED STATES PATENTS
2,963,184 12/1960 Graef .......................... 214/450
3,072,274 1/1963 Atwell ......................... 214/450

Primary Examiner—Gerald, M. Forlenza
Assistant Examiner—John Mannix
Attorney—James R. McKnight ABSTRACT: My structure permits inverting a boat by one person for loading onto or unloading from the top of an automobile. In my structure a bow pin is attached to the bow of the boat and rotates in the yoke of a bipod supported on the ground. The transom or other end of my boat has a removably attached unit with dolly struts and wheels and a rotatable clevis. A trailer hitch attached to the rear of the automobile supports a vertical mast on which is rotatably and slidably mounted a guide having an integral tang. The tang is inserted into the clevis. The boat is cradled and adapted to be inverted between the bow pin and yoke on one end and the clevis and tang on the other end. The boat is adapted to be pivoted and raised or lowered on the mast for loading and unloading on top of the automobile.

PATENTED FEB 23 1971
3,565,271
SHEET 1 OF 3
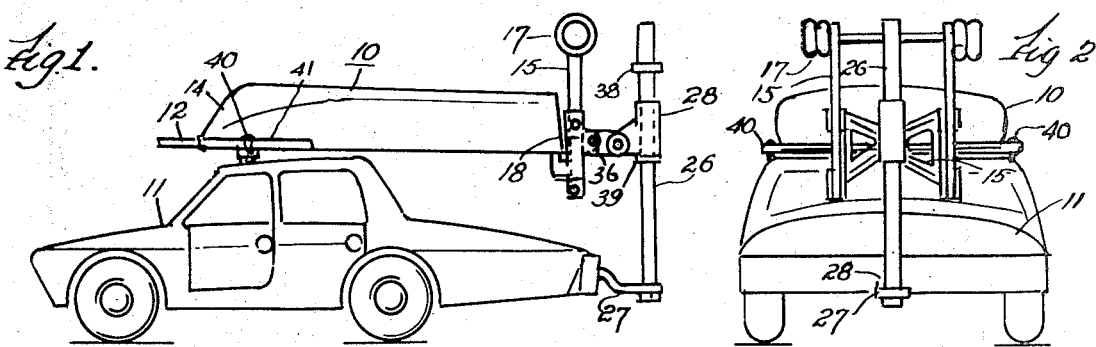
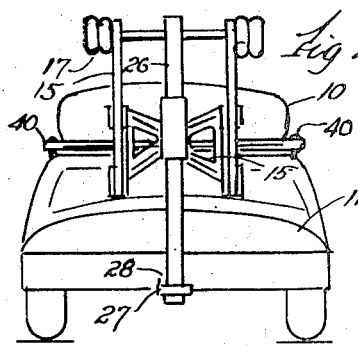
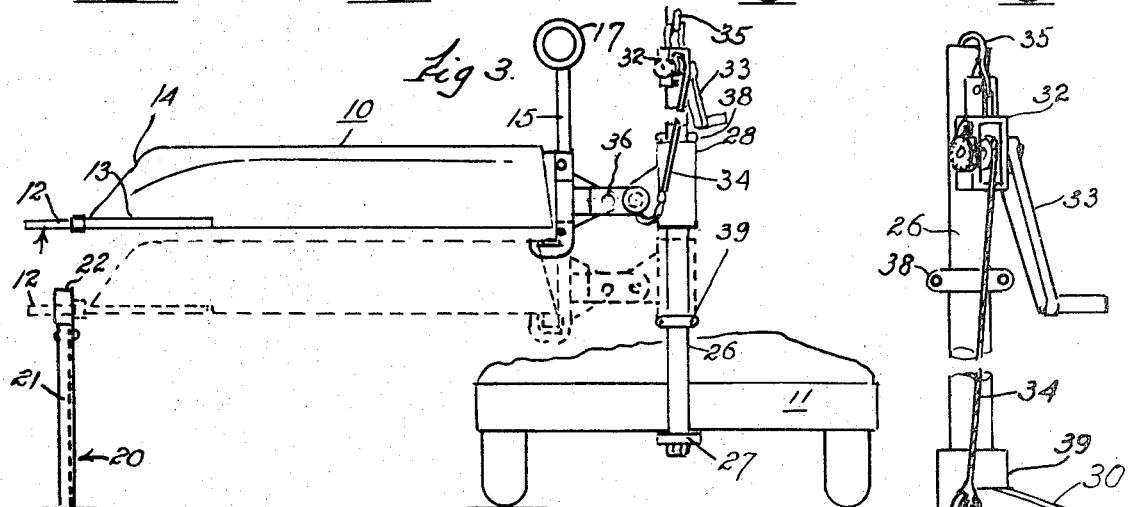
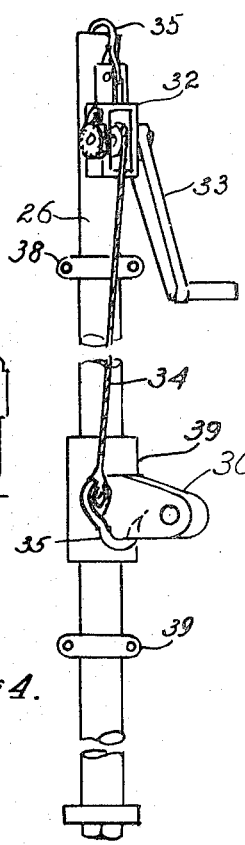
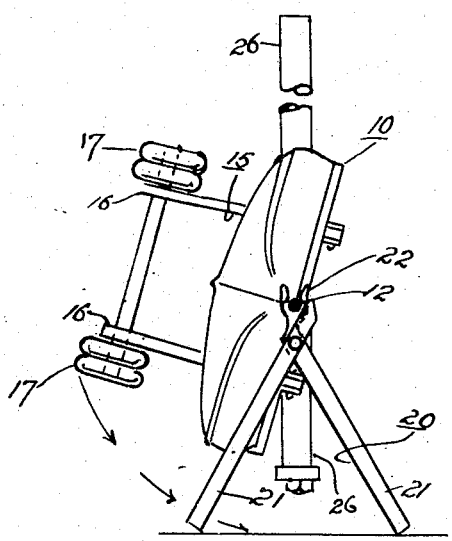
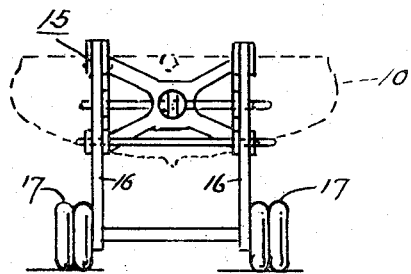
Inventor.
Wesley A Deck
by James R McKnight
Attorney.

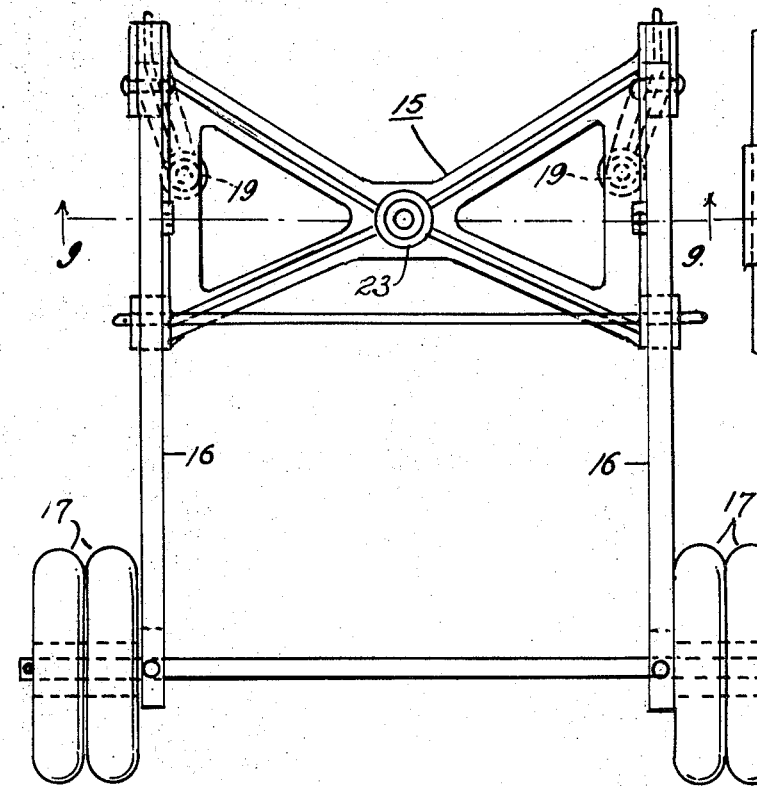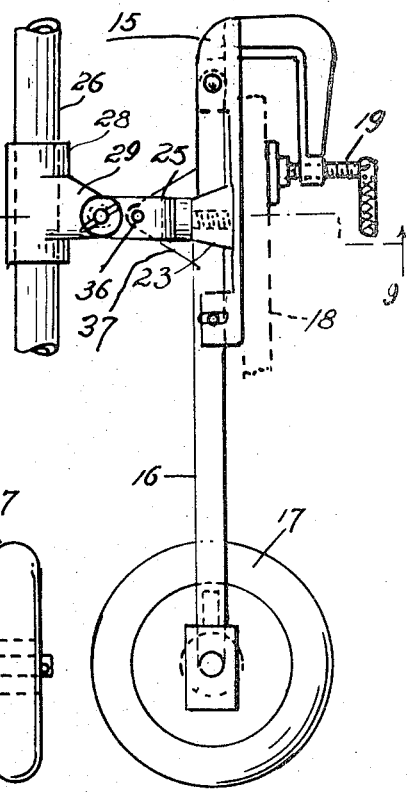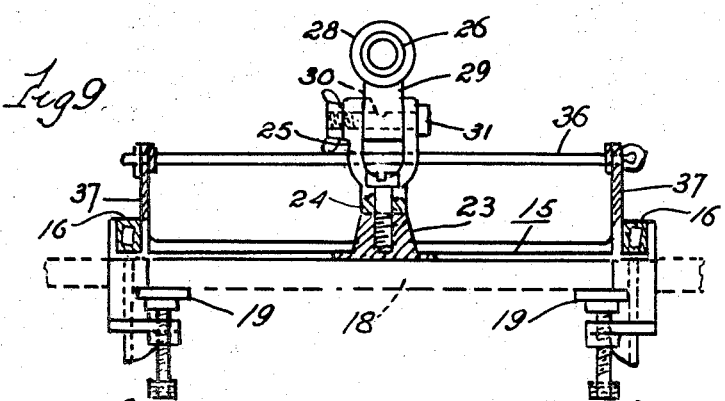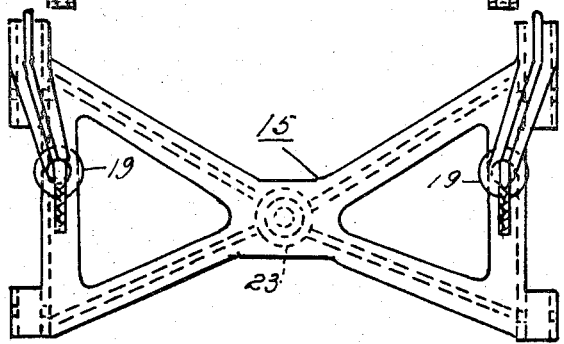

STRUCTURE FOR INVERTING A BOAT FOR LOADING ON AN AUTOMOBILE

My invention relates to a structure for inverting a boat for loading on the top of an automobile, and vice versa, the corresponding unloading, to be readily performed by one person.

An object of my invention is to provide a structure operable by any one person who can lift one end of the boat, to invert it and load it onto the top of an automobile for transporting, and conversely to unload the boat from the automobile and invert it in position for use on water.

My structure is adaptable for use in connection with rowboats, johnboats, sailboats, heavy canoes with adapters outboard type fishing boats and the like up to 200 pounds empty weight. Any normal person who can lift one end of such boat may use my structure.

My invention also contemplates such other objects, advantages and capabilities as will later more fully appear, and which are inherently possessed by my invention.

While I have shown in the accompanying drawings a preferred embodiment of my invention, yet it is to be understood that the same is susceptible of modification and change without departing from the spirit of my invention.

Referring to the drawings:

FIG. 1 is a side elevational view of my structure with the boat on the automobile;

FIG. 2 is a rear view of the same;

FIG. 3 is an operational view of my structure;

FIG. 4 is a side elevational view of my winch;

FIG. 5 shows my cradle in operation;

FIG. 6 is a detailed view showing my dolly struts;

FIG. 7 is an enlarged view of my structure;

FIG. 8 is a vertical detailed view;

FIG. 9 is a sectional view on line 9-9 of FIG. 7;

FIG. 10 is a rear view of my unit;

Figure 11:
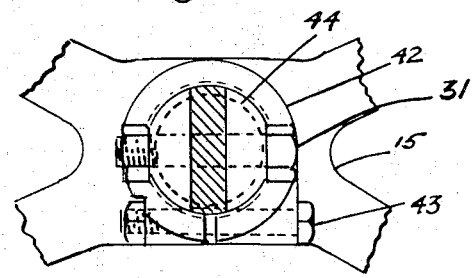
FIGS. 11, 12, 13 and 14 are detailed views of a modification of my locking feature.

The embodiment selected for illustrating my structure for inverting a boat 10 for loading on an automobile 11 comprises a bow pin or spit 12 attached by bracket 13 to the bow 14 of the boat 10.

A main clamping unit 15 is removably mounted on the boat. Said unit 15 has removable struts 16 pivotally mounted thereon and wheels 17. The unit 15 is removably placed over the transom 18 of the boat 10 at approximately the centerline and is held in position thereon by tightening clamp screws 19. The boat 10 may be rolled on wheels 17 so that said unit 15 is moved in alignment with the rear of the automobile 11 onto which the boat 10 is to be loaded.

To begin the loading operation, bipod 20 is positioned with its legs 21 in spread position on the ground or other support. The bipod 20 has a yoke 22 at its upper end, into which bow pin 12 is positioned to rotate thereon.

The main clamping unit 15 has a boss 23 on which shank 24 of clevis 25 is rotatably mounted.

A vertical mast 26 is removably mounted on and screwed to trailer hitch 27 attached to the rear of the automobile 11. An adjustable rotatable guide 28 is slidably mounted on said mast 26, and has a tang 29 as an integral portion. A hole 30 is bored through tang 29.

In the loading operation, the boat 10 is moved, until the tang 29 is in alignment with clevis 25 and is inserted into the opening of the clevis. A bolt 31 is then inserted into the openings in the clevis and the tang to hold them together.

The boat 10 is then raised by suitable means such as a winch or a jacking mast or the like. The boat is raised to half beam position so that it may be free to rotate or be inverted without contacting the ground. The boat is cradled between the bow pin and the yoke and the tang and the clevis.

A preferred raising means in my structure consists of a winch 32 having a spool 33, a cable 34, hooks 35, and the usual crank handle. The hooks 35 are removably attached to the top of the mast 26 on one end and at the other end to the guide 28.

In this half beam position, the boat 10 is free to rotate. It is only necessary to turn or invert the boat 180° so that it is opposite its position when used in the water. To hold the boat in this inverted position and prevent further rotation, a pin 36 is inserted through openings in holding arms 37 and clevis 25.

The boat is then raised to a predetermined high position and locking collar 38 and a locking clamp 39 mounted on mast 26 below tang 29 is tightened to hold the boat in fixed high position.

The operator removes the bipod 20 and walks the boat around 180° and swings the boat 10 on top of the automobile 11 with the bow of the boat resting on a support or car top carrier 40 on the roof of the car with suitable securing members 41 for holding the boat in position.

The unloading of the boat from the automobile follows the aforesaid in reverse, permitting the boat to be lowered, pivoted and inverted for moving into the water in proper usable position.

It is to be noted that the boat is under the operator's control during all phases of the loading and unloading procedure, even under adverse conditions.

With my structure, the boat may be loaded or unloaded quickly and easily by any normal person who can lift one end of the boat.

My structure provides that the dolly struts of the clamping unit may be swung up for clearance on shallow launch or landing, and that the unit may be attached when the boat is either on land or in the water.

My cradle permits the boat to be rotated to any position and even to be held by locking means in vertical position for inspection, cleaning, painting or repairs.

My structure is easily removable, light in weight, and compact for storage.

Figure 12:
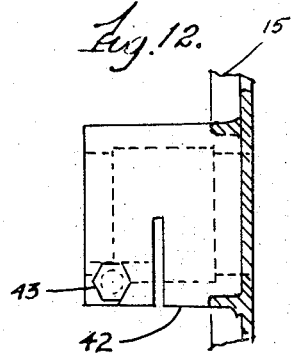
Figure 13:
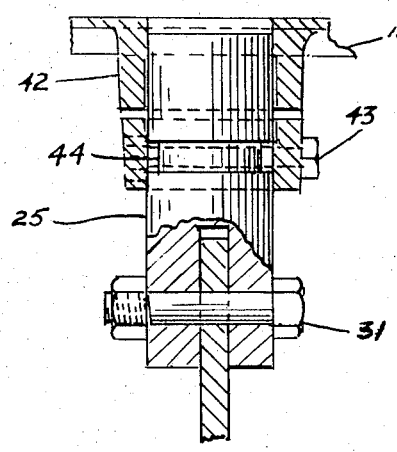
Figure 14:
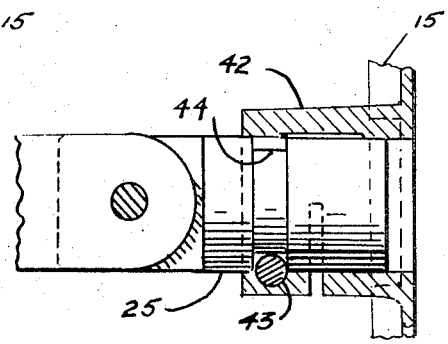

Another embodiment as shown in FIGS. 11—14 of the drawings, to prevent rotation of the boat and hold it in desired fixed position comprises a split-clamping boss 42 which is part of unit 15. A clamp-tightening bolt 43 is threaded into the clamping portion of boss 42. Clevis 25 has a groove 44 to receive bolt 43. When bolt 43 is tightened, the clamping portion of boss 42 locks clevis 25 in desired position of rotation or inversion. This bolt 43 has two functions. It not only tightens the claiming portion of boss 42, but it also retains clevis 25 in position in boss 42.

I claim:

1. A structure for inverting a boat for loading on an automobile comprising a bow pin attached to the bow of a boat, a bipod having legs for positioning the bipod on the ground and having at its upper portion a yoke, said yoke adapted to receive and rotatably hold said bow pin of the boat, a clamping unit removably attached to the transom of the boat, a clevis rotatably mounted on said unit, a trailer hitch attached to the rear portion of an automobile, a vertical mast attached at its lower end to said trailer hitch, a guide means slidably and rotatably mounted on said mast, and having an integral tang, said tang positioned within said clevis, and means for holding said tang within said clevis, means for raising the rear of the boat to half beam position so that the boat being cradled by said bow pin and said yoke on one end, and said tang and said clevis on the other end may be inverted 180° to bottoms-up position, said unit having means for holding the boat against further rotation.

2. The structure in claim 1, in which the means for holding the boat against further rotation consists of said unit having spaced arms and a pin positioned through said clevis and said arms.

3. The structure in claim 1, in which the means for holding the boat against further rotation consists of a split clamping boss as a part of said unit, clamp-tightening bolt threaded to said boss, said clevis having a groove for receiving said bolt so that when tightened the clevis is locked in desired fixed position.

4. The structure in claim 1, in which said raising means is adapted to lift the inverted boat to high position, and the boat is adapted to be axially pivoted 180° on said mast, so that its bow position is at the front end of the automobile and rests on top of the automobile, and means for removably holding the boat in said position on the automobile.

5. The structure in claim 1, in which said clamping unit has dolly struts removably and pivotally mounted thereon, and wheels rotatably attached at the outer ends of said struts.